Patented July 11, 1933

1,917,519

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

AZO DYE AND METHOD OF MAKING SAME

No Drawing.   Application filed May 16, 1928. Serial No. 278,332.

Azo dyestuffs containing the chromophore group, $-N=N-$, have long been known and the importance thereof is attested to by their great number. However, up until 1883, when Boettiger discovered that on tetrazotizing benzidine and combining with naphthionic acid, a dyestuff known as Congo red was obtained which dyed cotton direct, no azo dyestuff was known which was capable of dyeing cotton or other vegetable fibers without mordanting. Special importance has accordingly attached to these so-called symmetrical secondary diazo compounds thus formed by combining two molecules of an amine or a phenol with the product obtained by diazotizing a molecule of a diamine.

As noted in Wahl's "Organic Dyestuffs" (G. Bell and Sons, Ltd., London, 1919: p. 122), the property of giving substantive or direct cotton dyestuffs belongs to all azo derivatives of benzidine and some of its substitution products. I have now discovered that azo dyestuffs having similar properties may also be derived from amino diaryl ethers such, for example, as diaminodiphenyl ether. The particular importance of this discovery resides in part in the fact that such diaminodiphenyl ether can be easily and cheaply prepared from diphenyl oxide.

To the accomplishment of the foregoing and related ends, the invention, then, consists of the steps and resulting dyestuff products hereinafter fully described and particularly pointed out in the claims, the following description setting forth but several of the various ways in which the principle of the invention can be utilized.

The procedure involved in making these new azo dyestuffs and specifically disazo and trisazo compounds, in which an amino diaryl ether forms the starting point, will be best illustrated by the following actual examples, viz:—

(1) 20 parts of diaminodiphenyl ether are tetrazotized in acid solution with 14 parts of sodium nitrite. The temperature can vary from zero degrees C. up to 40 to 50 degrees C. The resulting tetrazo solution is then almost neutralized, a water solution of 17.4 parts of phenyl methyl pyrazolone and 12 parts of sodium carbonate is added cold and the resulting mixture kept under stirring from 3 to 4 hours, as a result of which a yellowish precipitate is produced. To the mixture is then added a solution of 24 parts of J acid and 6 parts of sodium carbonate, whereupon the precipitate at once changes to a scarlet color. It is then stirred for 10 hours, warmed to 40 degrees C. and after cooling is filtered and dried.

The constitution of such precipitate, which is the resulting dyestuff product, may be represented by the formula:

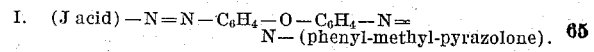

I.   (J acid) $-N=N-C_6H_4-O-C_6H_4-N=$
     $N-$ (phenyl-methyl-pyrazolone).

The dried product is a reddish brown powder sparingly soluble in cold water and cold alcohol, more readily soluble in hot water and hot alcohol, with a reddish color. The aqueous solution does not change by adding sodium hydroxide, but turns purplish with hydrochloric acid. Concentrated sulphuric acid dissolves the same with a deep purplish color and upon adding water to the solution, a brownish precipitate is produced. Such product dyes cotton direct a fiery scarlet color.

(2) From 20 parts of diaminodiphenyl ether the tetrazo solution is made as in Example 1. To this a solution of 14.3 parts of a-naphthylamine in dilute hydrochloric acid is added under constant stirring; and then sodium acetate solution is added, resulting in the production of a brownish precipitate. After 24 hours stirring, 7 parts of sodium nitrite and an excess of hydrochloric acid is added to transform the amino group of the naphthylamine into a diazo group. After 24 hours stirring at a temperature of from 10 to 20 degrees C., the solution is substantially neutralized. A solution is then made from 62 parts of H acid and 24 parts of sodium carbonate, cooled to from zero to 5 degrees C., and into this solution the tetrazo compound prepared as above is stirred under cooling. After 10 hours stirring sufficient salt (NaCl) is added to precipitate the dye which is then filtered and dried.

The constitution of such precipitate, which is the resulting dyestuff product, may be represented by the formula:

II. (H acid)—N=N—(naphthylamine)—N=N—C₆H₄—O—C₆H₄—N=N—(H acid).

Such resultant dyestuff product is a dark powder, soluble in water, with a purplish color, while with sodium hydroxide solution it turns very reddish and with hydrochloric acid produces a violet precipitate. Said dyestuff is almost insoluble in alcohol but dissolves in concentrated sulphuric acid to produce a deep blue solution, the addition of water to which gives a violet precipitate. Such product dyes cotton direct a violet color.

(3) From 20 parts of diaminodiphenyl ether the tetrazo solution is made as in Example 1 above. To this a solution of 13.7 parts of anthranilic acid in water and the necessary amount of hydrochloric acid is added below 10 degrees C. under steady stirring; also a solution of sodium acetate. After a short time a yellowish sandy powder is precipitated, following which the reaction mixture is stirred for 12 hours and such precipitate then filtered off. The latter is then suspended in water, hydrochloric acid and 7 parts of sodium nitrite are added to transform the amino group of the anthranilic acid group into a diazo group. After stirring for 6 hours at from 10 to 15 degrees C. an almost clear solution is formed, which is thereupon almost neutralized and stirred into a solution of 64 parts of 2S acid and 25 parts of sodium carbonate at 10 degrees C. A bluish red dye immediately precipitates and after 12 hours stirring it is filtered off and dried.

The constitution of such precipitate which is the resulting dyestuff product may be represented by the formula:

III. (2S acid)—N=N—(anthranilic acid)—N=N—C₆H₄—O—C₆H₄—N=N—(2S acid).

The dyestuff product is a dark brown powder which is soluble in water with a Bordeau red color. Such color does not change with hydrochloric acid but sodium hydroxide turns the color to a lighter red. It is almost insoluble in alcohol but dissolves in concentrated sulphuric acid yielding a violet solution which upon dilution with water turns red. The product dyes cotton direct a bluish red.

(4) 14.5 parts of p-nitro aniline are diazotized and 31.4 parts of H acid in acid solution thereupon added yielding a dye product as a precipitate. The latter is then filtered off and dissolved in about 500 parts of water and 40 parts of sodium carbonate and thereupon cooled to 5 degrees C. A tetrazo solution made from 20 parts of diaminodiphenyl ether is thereupon added slowly under stirring and after one hour 12 parts of phenol are added and the resulting mixture stirred for 5 hours between 10 and 15 degrees C. After being allowed to stand for approximately 16 hours at a temperature of from 20 to 25 degrees C., the resulting solution is then warmed up to 60 degrees C. and 200 parts of salt (NaCl) are added, resulting in the precipitation of a green dye which is then filtered off and dried.

The constitution of such precipitate, which is the resulting dyestuff product, may be represented by the formula:

IV. (Nitrobenzene)—N=N—(H acid)—N=N—C₆H₄—O—C₆H₄—N=N—(phenol).

The dye product is a dark powder which dissolves in water with a green color. The addition of hydrochloric acid yields a dark green precipitate while sodium hydroxide gives a brown precipitate. Alcohol dissolves with a bluish green color while with concentrated sulphuric acid a black precipitate is given. The product dyes cotton direct a green color.

All of the several azo-dyestuffs produced in accordance with the foregoing examples may be represented by the following general formula:—

V. X—N=N—R—O—R′—N=N—Y, wherein R and R′ represent aryl groups and X and Y represent suitable coupled residues. This naturally results from tetrazotizing the diaminodiphenyl ether, which constitutes the starting point in the preparation of each such dye-stuff, such ether being represented by the structural formula:—

VI. NH₂—⟨ ⟩—O—⟨ ⟩—NH₂

Instead of starting thus with a simple diaminodiphenyl ether, one may be employed wherein the phenyl groups have been substituted, symmetrically or otherwise, with a halogen, a nitroradical or a sulphonic radical, the latter being represented by the structural formula:—

VII. NH₂—⟨ ⟩—O—⟨ ⟩—NH₂
        |              |
       SO₃H          SO₃H

Similarly, homologues of diaminodiphenyl ether may be employed, wherein the one or both of the aryl groups is tolyl, naphthyl or the like, as illustrated in the following structural formula for diaminophenylnaphthyl ether:—

NH₂—⟨ ⟩—O—⟨⟨ ⟩⟩—NH₂

The procedure in tetrazotizing each of the foregoing diamino diaryl ethers is substantially the same, and suitable residues, whether amines or phenols, may be coupled to the resulting tetrazo-compound in the manner sufficiently illustrated in the several examples given. Furthermore, where an amine is thus coupled to the tetrazo-compound such amine may in turn be diazotized and the resulting azo-tetrazo-compound in turn coupled with suitable residues, as illustrated in Example 2, above.

In connection with such last-mentioned example, it should be noted that product having the same constitution may be prepared by coupling the tetrazo-compound with suitable residues including the amine, diazotizing the latter, and then coupling the resulting disazo-diazo compound with the indicated residue.

The intermediate tetrazo-compounds produced in carrying out the present improved process in general do not combine at once, in the coupling step, with both residues, whether amine or phenol, but prolonged or special treatment may be required to complete the step. An excellent opportunity is thus afforded for producing so-called mixed disazo-compounds, wherein as illustrated in the foregoing examples the residues coupled to the respective ends are in each case different. It will be understood, however, that if desired, compounds having a strictly symmetrical structure may be produced.

The term "unaminated", as employed in certain of the claims, shall be understood to mean having no free amino groups.

Other modes of applying the principle of my invention may be employed instead of the one explained, change being made as regards the method herein disclosed, provided the steps, or ingredients stated by any of the following claims or the equivalent of such stated steps or ingredients be employed.

I therefore particularly point out and distinctly claim as my invention:—

1. As new products, azo-dyestuffs including a dis-azo compound probably having the general formula,

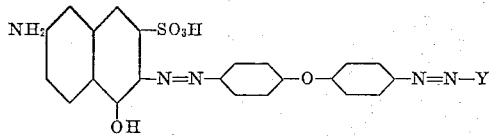

wherein Y represents a pyrazolone residue.

2. The method of making an azo dye which comprises coupling tetrazotized di-amino-diphenyl-ether with phenyl-methyl-pyrazolone and J acid.

3. As a new product, an azo dye of the probable formula

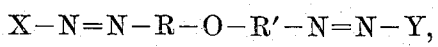

4. As a new product, an azo dye having the general formula, $$X-N=N-C_6H_4-O-C_6H_4-N=N-Y,$$

wherein X and Y represent residues of compounds capable of being coupled with diazotized aromatic amino compounds, one such residue being an unaminated pyrazolone derivative.

5. The method of making an azo dye which comprises coupling a tetrazo-compound, derived from a diamino diaryl ether having the general formula, $H_2N-R-O-R'-NH_2$, wherein R and R' represent aryl residues of the benzene and/or naphthalene series, with azo dye components one of the so-coupled azo dye components being an unaminated pyrazolone derivative.

6. The method of making an azo dye which comprises coupling a tetrazo-compound, derived from a diamino diaryl ether having the general formula, $$H_2N-R-O-R'-NH_2,$$

wherein R and R' represent aryl residues of the benzene and/or naphthalene series, with azo dye components one of the so-coupled azo dye components being phenyl-methyl pyrazolone.

7. The method of making an azo dye which comprises coupling a tetrazo-compound, derived from a diamino diaryl ether having the general formula, $H_2N-R-O-R'-NH_2$, wherein R and R' represent aryl residues of the benzene and/or naphthalene series, with an unaminated pyrazolone derivative and J acid.

8. As a new compound, an azo dye having the general formula, $$X-N=N-R-O-R'-N=N-Y,$$

wherein R and R' represent aryl residues of the benzene and/or naphthalene series and X and Y represent residues of compounds capable of being coupled with diazotized aromatic amino compounds, one such residue being that of an unaminated pyrazolone.

9. As a new compound, an azo dye having the general formula, $$X-N=N-R-O-R'-N=N-Y,$$

wherein R and R' represent aryl residues of the benzene and/or naphthalene series and X and Y represent residues of compounds capable of being coupled with diazotized aromatic amino compounds, one such residue being that of phenyl-methyl pyrazolone.

10. As a new compound, an azo dye having the general formula, $$X-N=N-R-O-R'-N=N-Y,$$

wherein R and R' represent aryl residues of the benzene and/or naphthalene series and X and Y represent residues of J acid and an unaminated pyrazolone, respectively.

11. As a new compound, an azo dye having the general formula, $$X-N=N-R-O-R'-N=N-Y,$$

wherein R and R' represent aryl residues of the benzene and/or naphthalene series and X and Y represent J acid and phenyl-methyl-pyrazolone, respectively.

12. As a new compound, an azo dye having the general formula, $$X-N=N-R-O-R'-N=N-Y,$$

wherein R and R' represent aryl residues of the benzene and/or naphthalene series and X and Y represent different residues, each such residue being that of a compound capable of being coupled with a diazotized aromatic amino compound and one of said residues being that of phenyl-methyl-pyrazolone.

13. As a new compound, a trisazo dye having the general formula, $$X-N=N-R-O-R'-N=N-R''-N=N-Y,$$

wherein R, R', and R'' represent aryl residues of the benzene and/or naphthalene series and X and Y represent residues of compounds capable of being coupled with diazotized aromatic amino compounds, one of said residues being that of an unaminated pyrazolone.

14. As a new compound, an azo dye having the general formula, $$X-N=N-C_6H_4-O-C_6H_4-N=N-Y,$$

wherein X and Y represent different residues, each such residue being that of a compound capable of being coupled with a diazotized aromatic amino compound and one of said residues being that of phenyl-methyl-pyrazolone.

15. As a new compound, an azo dye having the general formula, $$X-N=N-C_6H_4-O-C_6H_4-N=N-R''-N=N-Y,$$

wherein R'' represents an aryl residue of the benzene or naphthalene series and X and Y represent residues of compounds capable of being coupled with diazotized aromatic amino compounds, one of said residues being that of phenyl-methyl-pyrazolone.

Signed by me this 12th day of May 1928.
ERNEST F. GRETHER.